United States Patent

Nishio et al.

Patent Number: 5,132,848
Date of Patent: Jul. 21, 1992

[54] WIDEANGLE FOUR GROUP ZOOM LENS

[75] Inventors: Akihiro Nishio, Yokohama; Makoto Sekita, Higashiyamato, both of Japan

[73] Assignee: Canon Kabushiki Kaisha, Tokyo, Japan

[21] Appl. No.: 781,579

[22] Filed: Oct. 23, 1991

[30] Foreign Application Priority Data

Oct. 26, 1990 [JP] Japan .................. 2-290357

[51] Int. Cl.$^5$ ............................................. G02B 15/14
[52] U.S. Cl. ...................................... 359/686; 359/740
[58] Field of Search ................................. 359/686, 740

[56] References Cited

U.S. PATENT DOCUMENTS

| | | | |
|---|---|---|---|
| 4,516,839 | 5/1985 | Tokumaru | 359/686 |
| 4,591,235 | 5/1986 | Tokumaru et al. | 359/686 |
| 4,653,873 | 3/1987 | Kawamura | 359/686 |
| 4,687,302 | 8/1987 | Ikemori et al. | 359/686 |
| 4,759,617 | 7/1988 | Tokumaru et al. | 359/686 |
| 4,846,562 | 7/1989 | Tokumaru et al. | 359/686 |

*Primary Examiner*—Scott J. Sugarman
*Attorney, Agent, or Firm*—Fitzpatrick, Cella, Harper & Scinto

[57] ABSTRACT

A wideangle zoom lens has four lens groups including a first lens group having a negative refractive power, a second group having a positive refractive power, a third lens group having a negative refractive power and a fourth lens group having a positive refractive power. The first to fourth lens groups being arranged object side in that order. The zooming operation from a wideangle end to a telephoto end is performed by increasing the distance between the second and third lens groups while reducing the distance betwen the third and fourth lens groups. Zooming is performed by non-linearly moving the first lens group. The first to fourth lens groups are arranged to meet the following conditions:

$3.0 < F2/FW < 4.4$
$2.3 < F4/FW < 3.5$
$3.1 < |\beta 3W| < 3.95$ wherein Fi indicates the focal distance of the i-th lens group, FW indicates the focal distance of the whole lens system at the wideangle end and $\beta 3W$ indicates the imaging lateral magnification of the third lens group at the wideangle end.

3 Claims, 8 Drawing Sheets

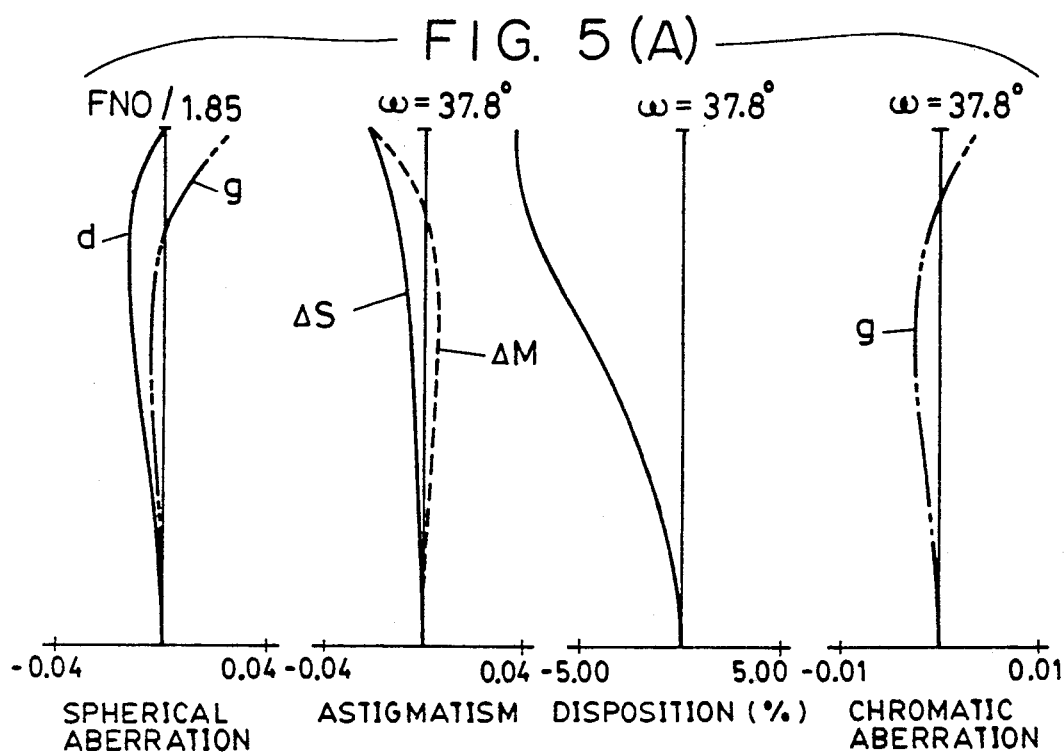
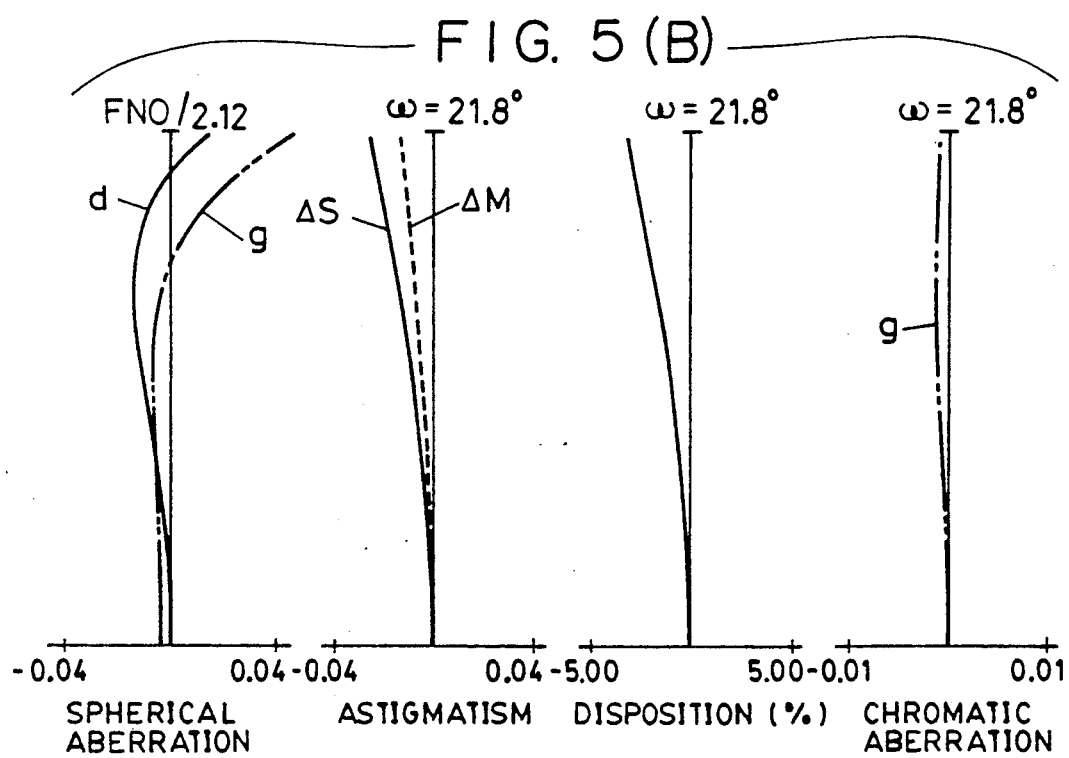

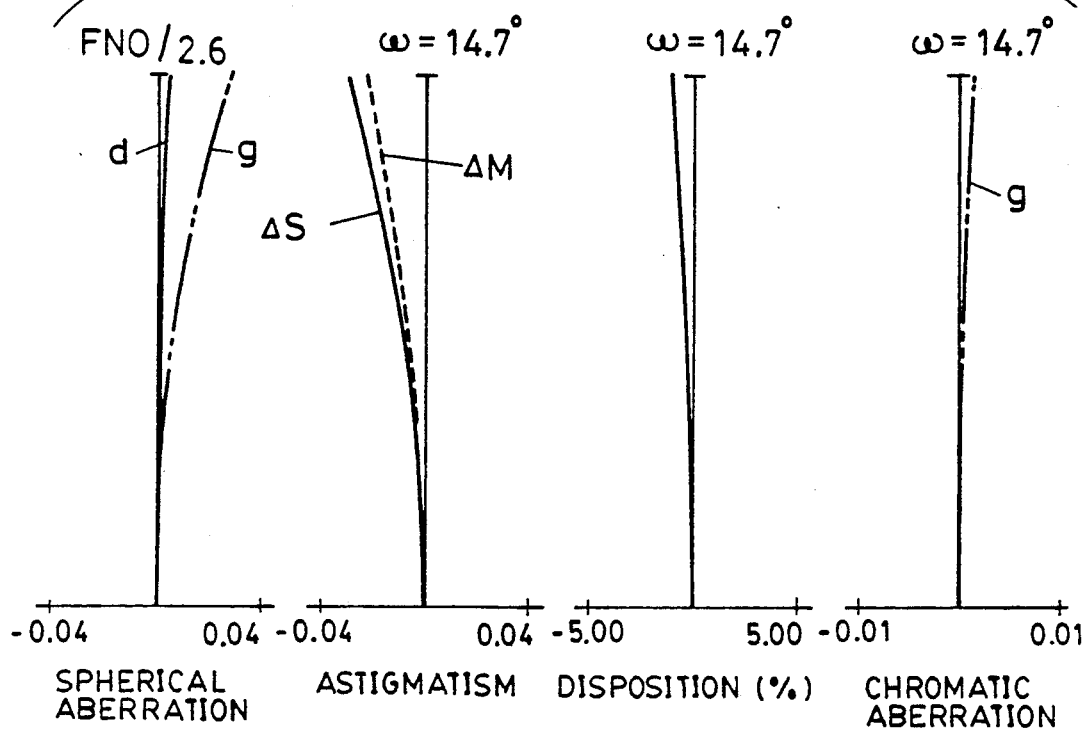
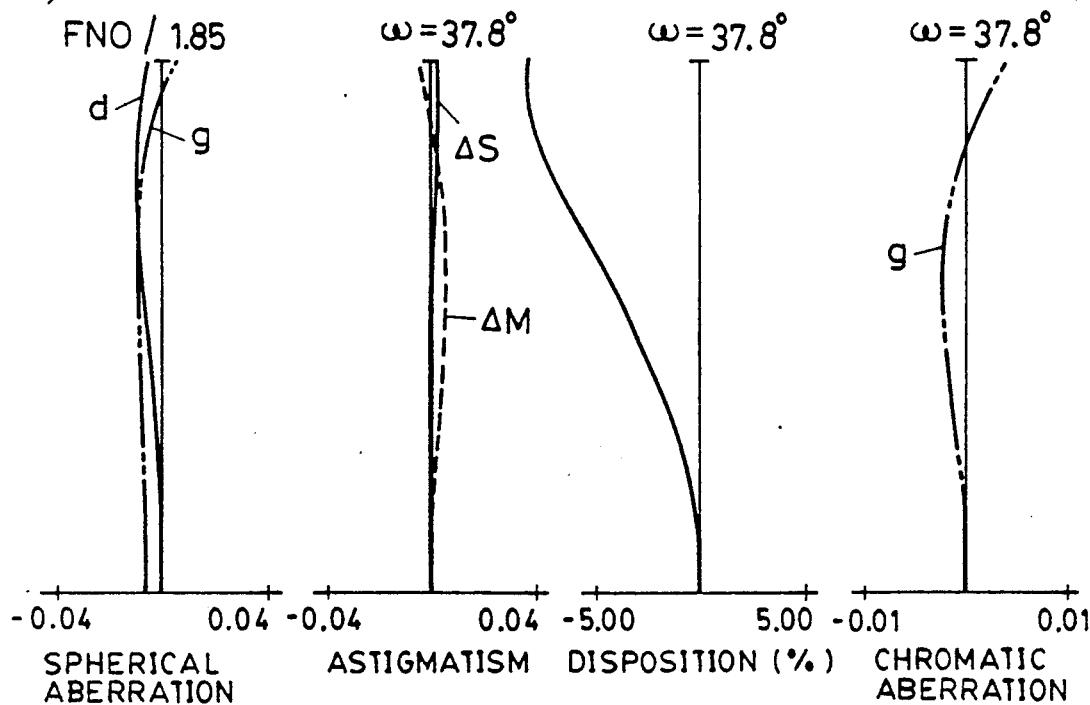

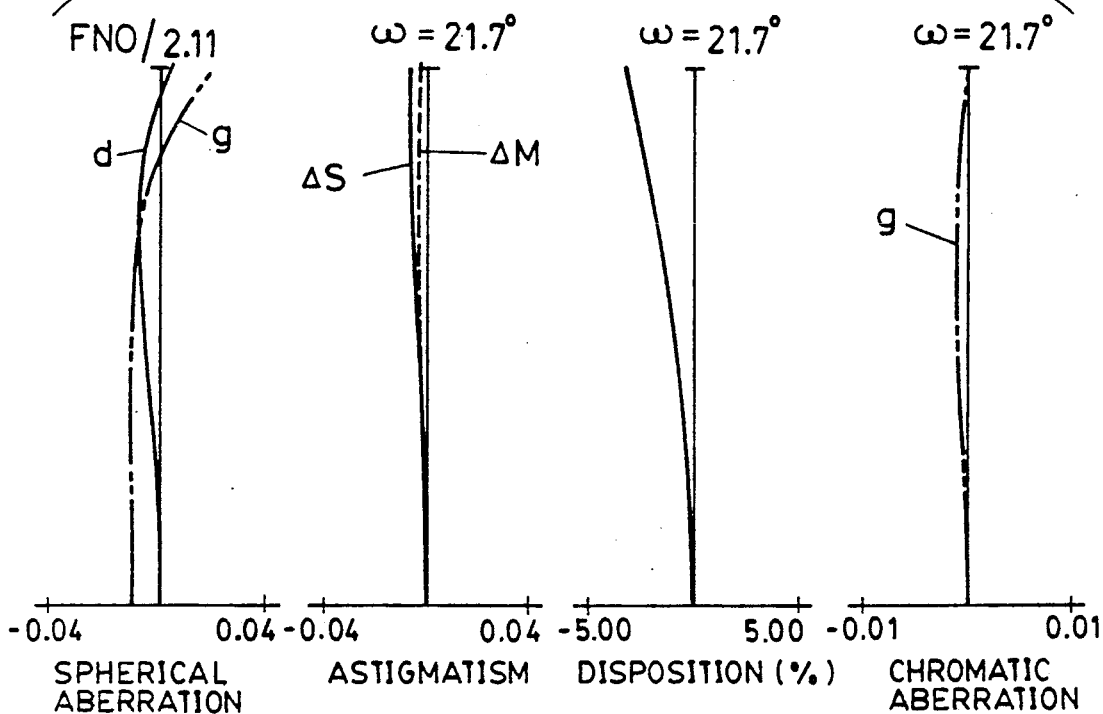
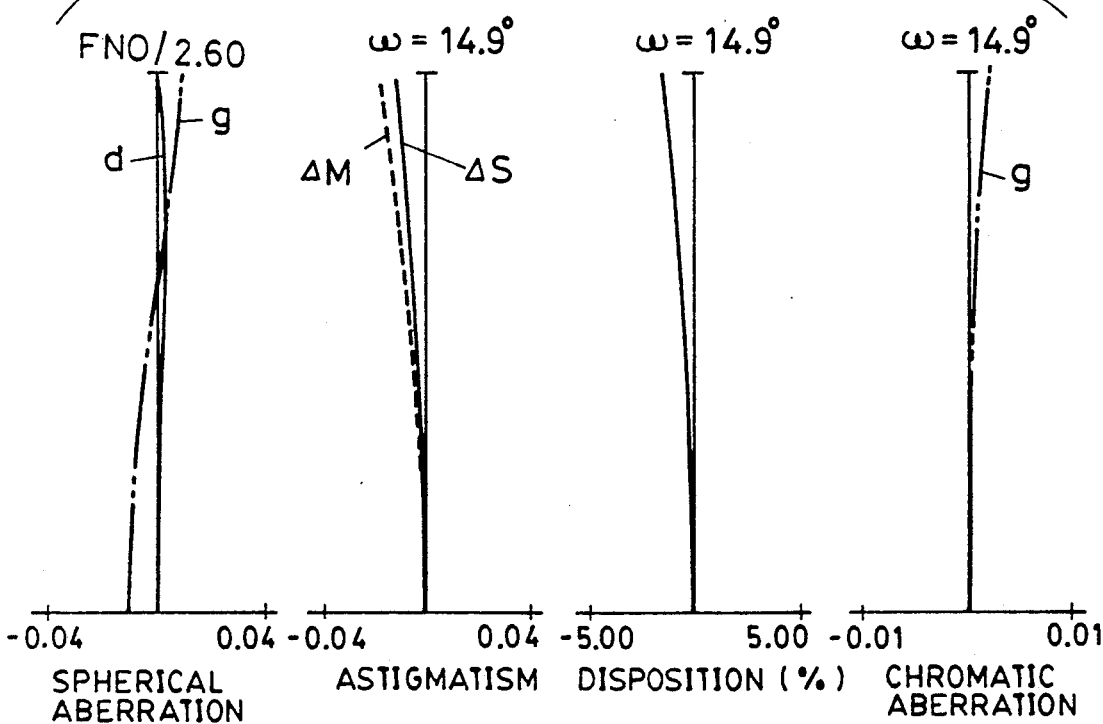

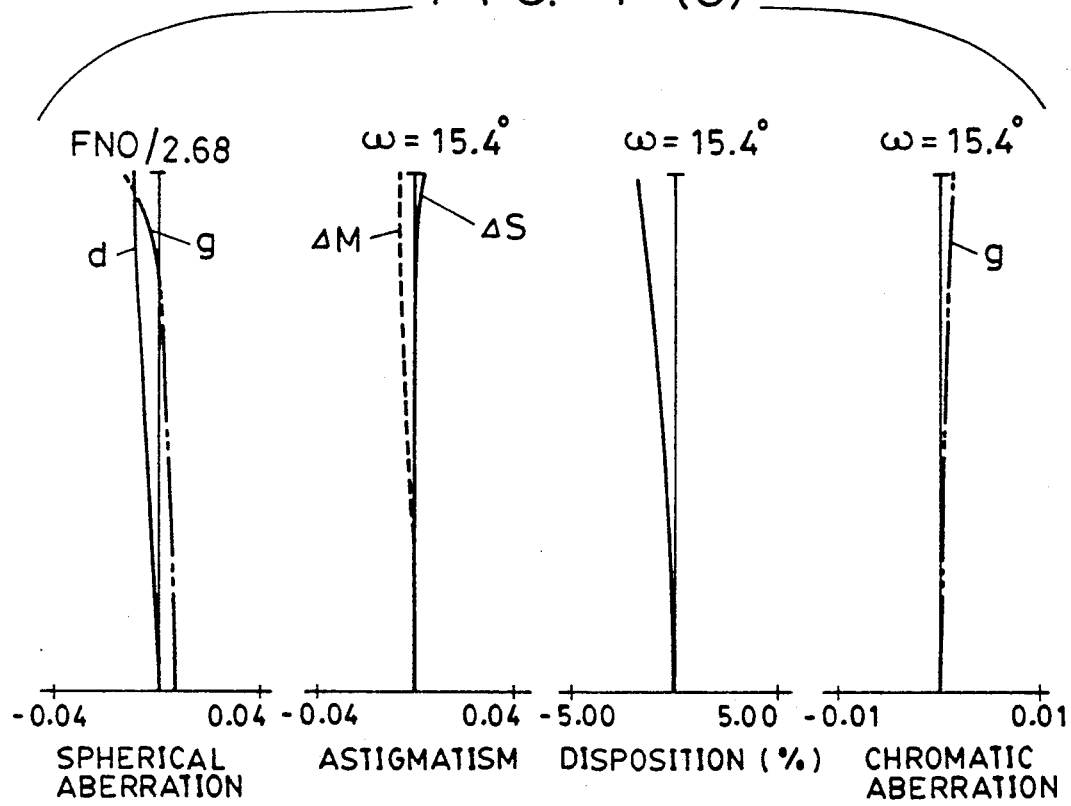

WIDEANGLE FOUR GROUP ZOOM LENS

BACKGROUND OF THE INVENTION

1. Field of the Invention

The present invention relates to a wideangle zoom lens device suitable for use in video cameras, SV (Still Video) cameras and so forth. More particularly, the present invention is concerned with a wideangle zoom lens that comprises four lens groups including a lens group which is on the object-side or leading end of the lens that has a negative refractive power. The four lens groups are suitably constructed and arrnaged to attain a variable power of 3.0 and an F number of 1.7, while reducing the overall size of the zoom lens.

2. Description of the Related Art

Hitherto, a zoom lens generally referred to as "negative-lead type zoom lens" has been known in which a lens group having a negative refractive power is provided on the object-side or leading end of device having a plurality of lens groups. This type of zoom lens has been broadly used as wideangle zoom lens devices having a view angle greater than 70°, because it is rather easy to obtain a large view angle with this type of zoom lens. For instance, U.S. Pat. No. 3,771,853 and Japanese Examined Patent Publication (Kokoku) No. 61-55094 discloses a zoom lens device of a type having a first lens group disposed on the object-side or leading end of the zoom lens device, a second lens group of a positive refractive power, a third lens group of a negative refractive power and a fourth lens group disposed on the imaging-side or trailing end of the lens device, wherein variation from the power from the wideangle end to the telephoto end is effected by moving the first lens group toward the image plane and the second and fourth lens groups toward the object, while fixing or suitably moving the third lens group.

Japanese Examined Patent Publication (Kokoku) No. 61-55094 (Japanese Unexamined Patent Publication No. 57-163213) proposes a zoom lens device which employs a 4-group lens system of negative, positive, negative and positive power, from the object side, wherein the third group is fixed so as to attain an F number of 4.0 or so, with a back focus of about 1.12 l, where l represents the length of the diagonal line of the photographing area.

In general, however, a negative-lead type zoom lens requires a careful consideration as to the refractive powers of the lens groups, in order to provide superior optical performance. The zoom lenses seek to attain a large view angle of 70° or greater and a large aperture ratio of 1.7 or so, while maintaining a required value of back focus, although widening of view angle is rather easy to attain with this type of zoom lens. Inappropriate arrangement of the refractive powers of the lens groups, as well as inadequate element arrangements in lens groups, causes aberration to fluctuate. This is largely in response to a zooming operation, regardless of an increase in the number of the lenses, thereby making it difficult to attain superior optical performance over the entire range of power variation.

For instance, although a wider view angle and longer back focus are obtainable by an increase in the negative refractive power of the first lens group, an unduly large negative refractive power of this lens group causes the aberration to vary significantly in response to a zooming operation.

In general, a single-lens reflex still-photography camera requires a predetermined back focus length in order to preserve a space for accommodating a quick return mirror. A video camera also requires that a predetermined back focus be maintained, so as to provide room for installation of various components such as a CCD, a cover glass, an optical filter and so forth. It is possible to obtain a large back focus by designing the whole lens system as an inverted telephoto lens system. Such a measure, however, makes it difficult to obtain superior optical performance over the entire range of variable power, due to the asymmetry of the whole lens system.

SUMMARY OF THE INVENTION

Accordingly, an object of the present invention is to provide a negative-lead type wideangle zoom lens having four lens groups including a lens group having a negative refractive power that is provided on the object-side or leading end of the zoom lens device. The lens moving conditions and refractive powers of the lens groups are suitably determined to provide a superior optical performance over entire range of variable power ratio of 3.0, as well as a view angle variable over the range from 76° to 31° and a small F number of 1.7 to 2.7, while preserving a back focus length of 1.7 l to 1.8 l, where l represents the length of a diagonal line across the photographing area.

To accomplish this object, according to the present invention, there is provided a wideangle zoom lens which comprises: a first lens group having a negative refractive power, a second lens group having a positive refractive power, a third lens group having a negative refractive power and a fourth lens group having a positive refractive power. The first to fourth lens groups are arranged from the object side in this order. The zooming operation from the wide angle end to the telephoto end is performed by increasing the distance between the second and third lens groups while reducing the distance between the third and fourth lens groups. The zooming operation is effected by non-linearly moving the first lens group. The first to fourth lens groups also are arranged to meet specific optical conditions, which will be described later.

BRIEF DESCRIPTION OF THE DRAWINGS

FIGS. 5A, 5B, 5C, 6A, 6B, 6C, 7A, 7B and 7C are illustrations of optical aberrations from the first to third examples.

DESCRIPTION OF THE PREFERRED EMBODIMENTS

Figure 1:
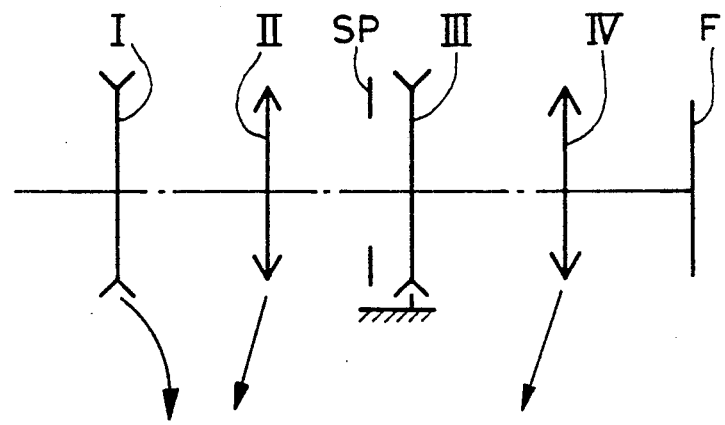
FIG. 1 is a schematic illustration of paraaxial refractive power arrangements for a wideangle zoom lens device in accordance with the present invention.
Figure 2:
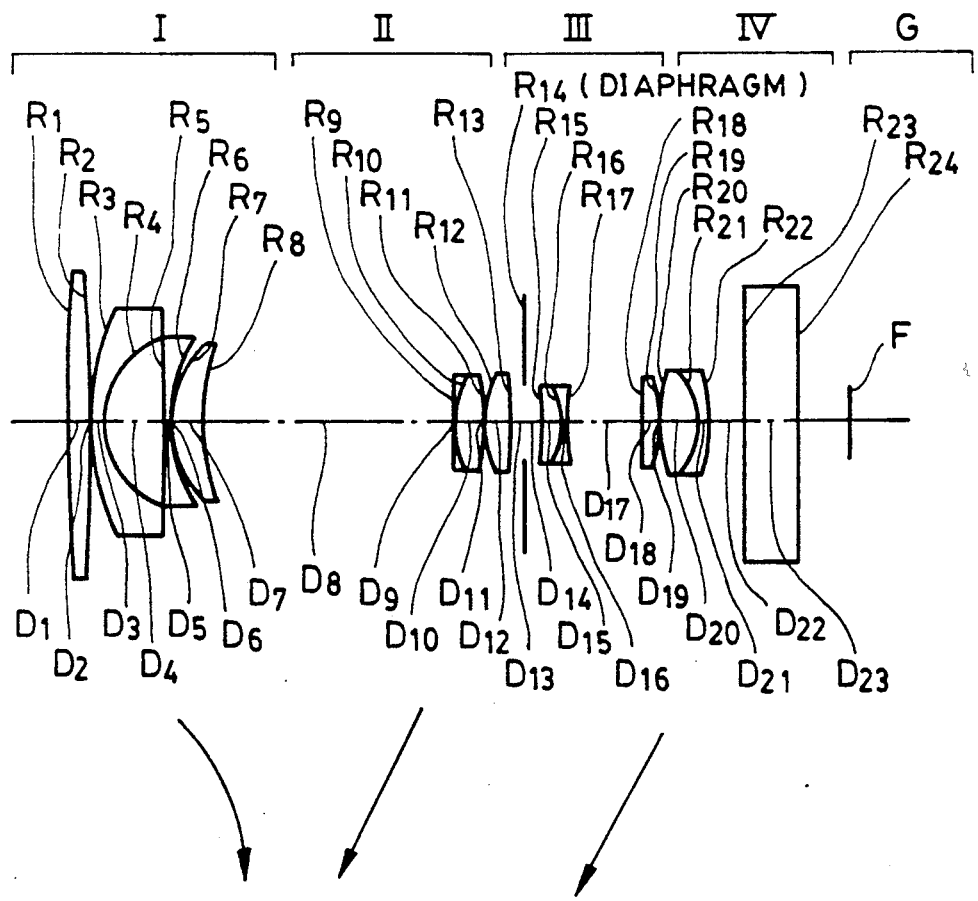
FIGS. 2 to 4 are schematic illustrations of positions of lens groups from the first to third examples of wideangle zoom lens of the present invention, wherein the wideangle zoom lens is set for its widest view angle.
Figure 3:
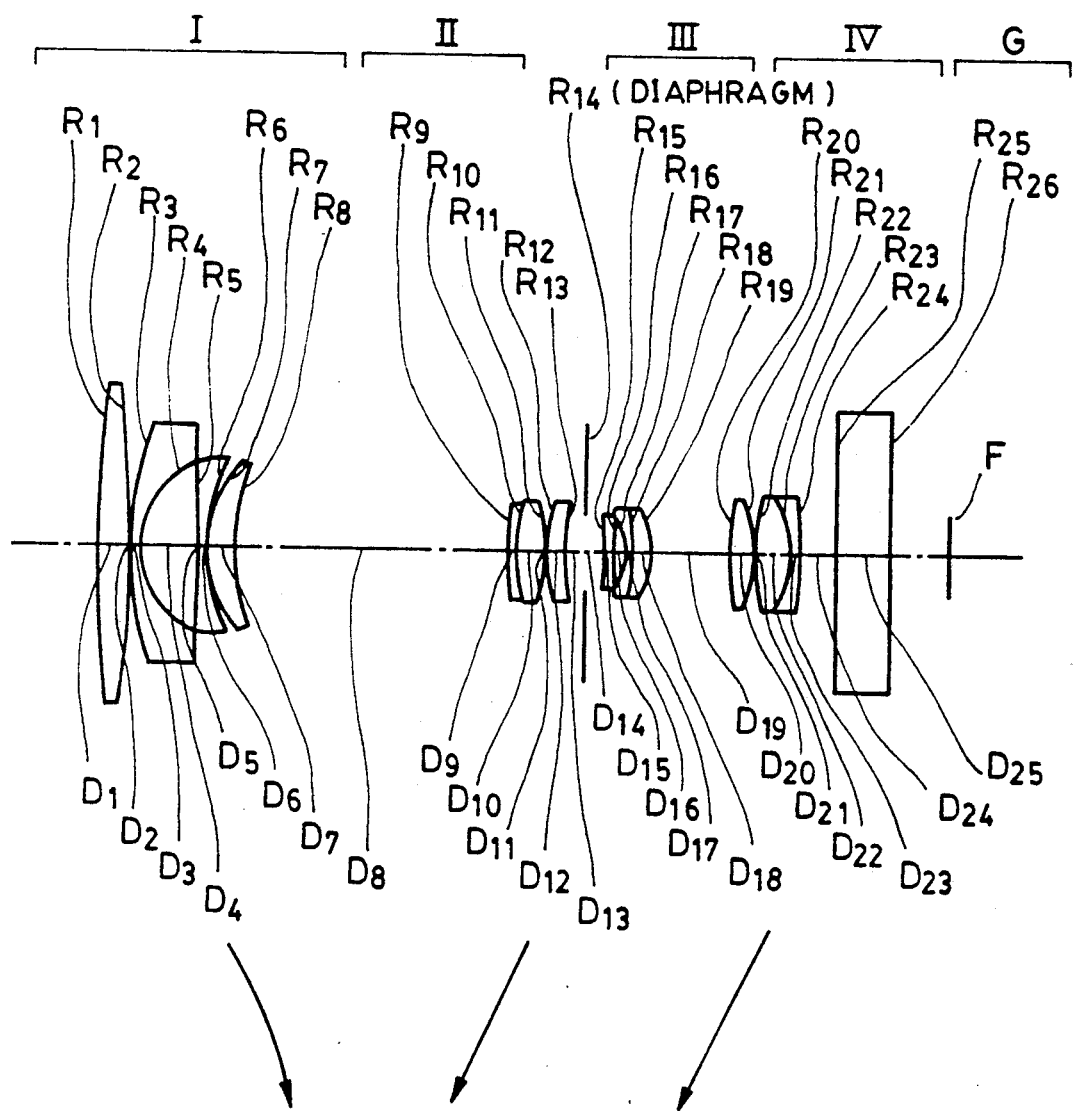
Figure 4:
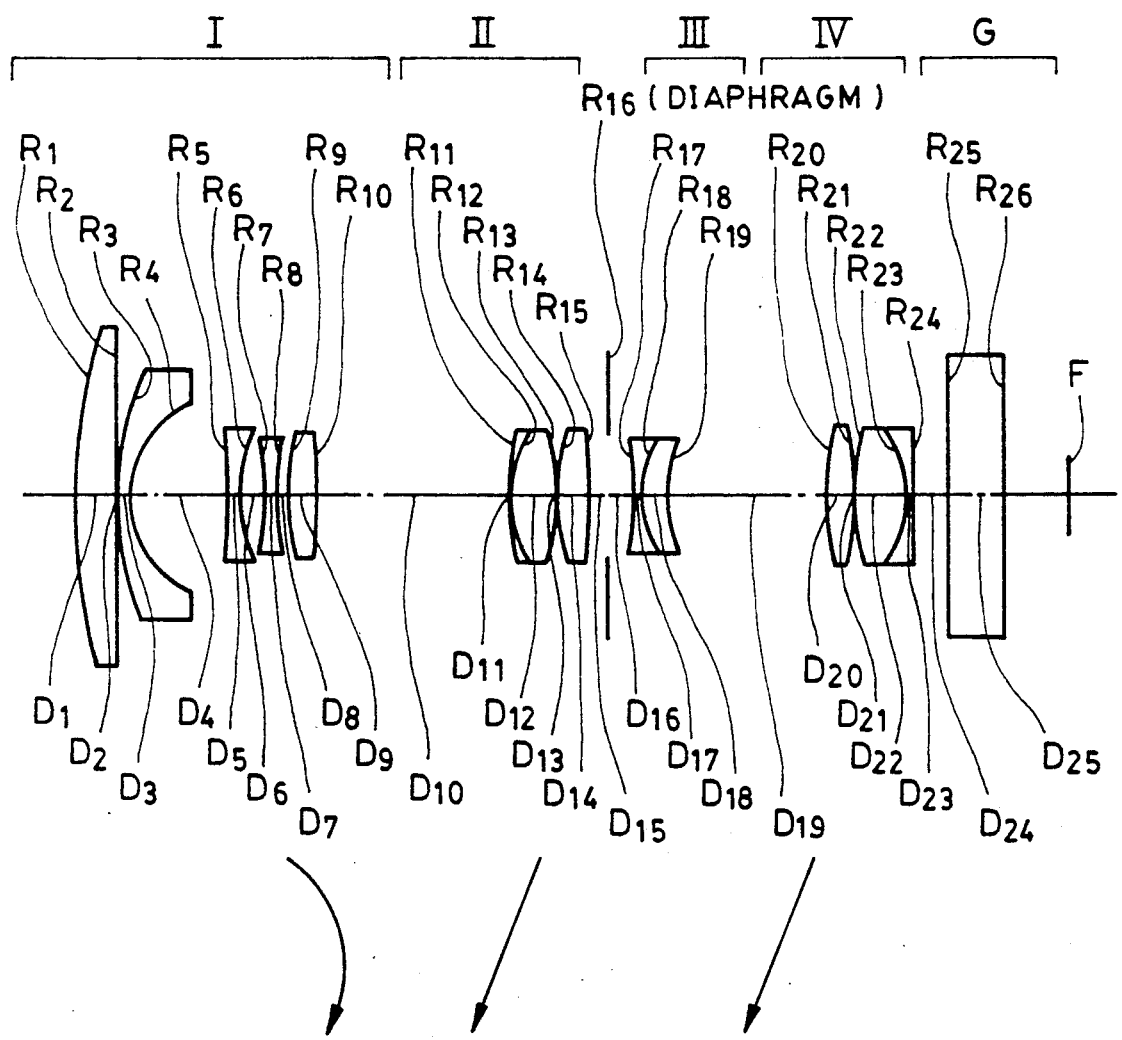
Figure 7A:
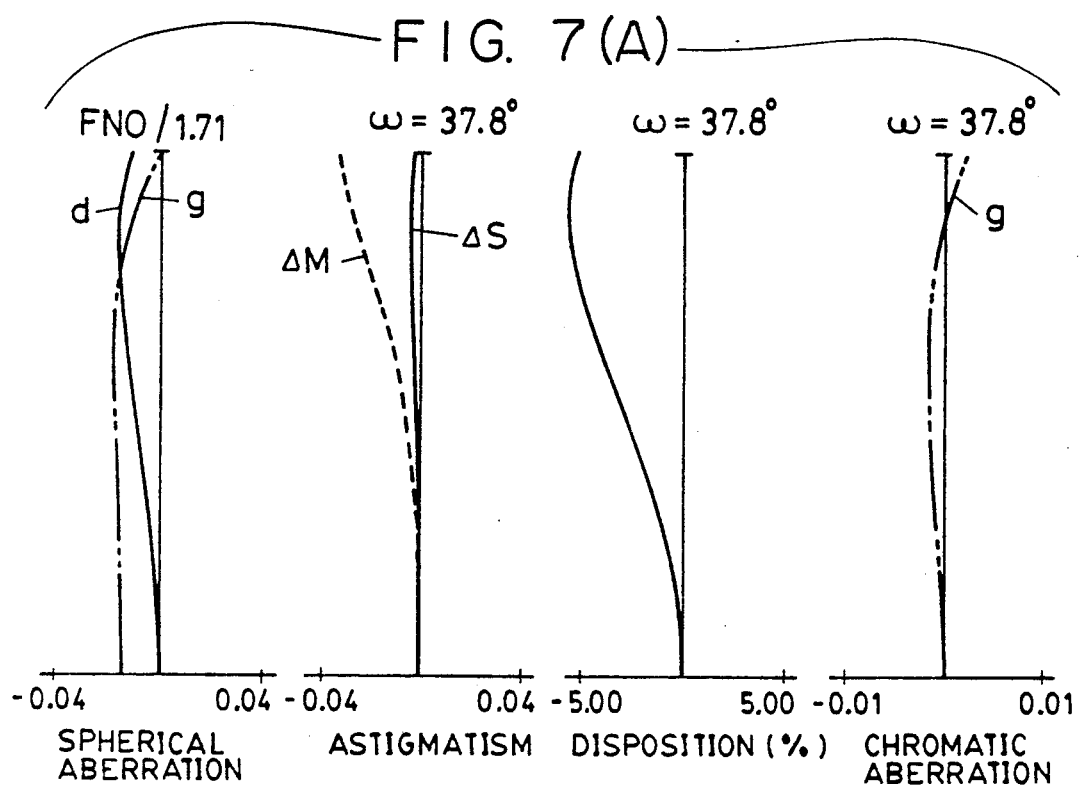
Figure 7B:
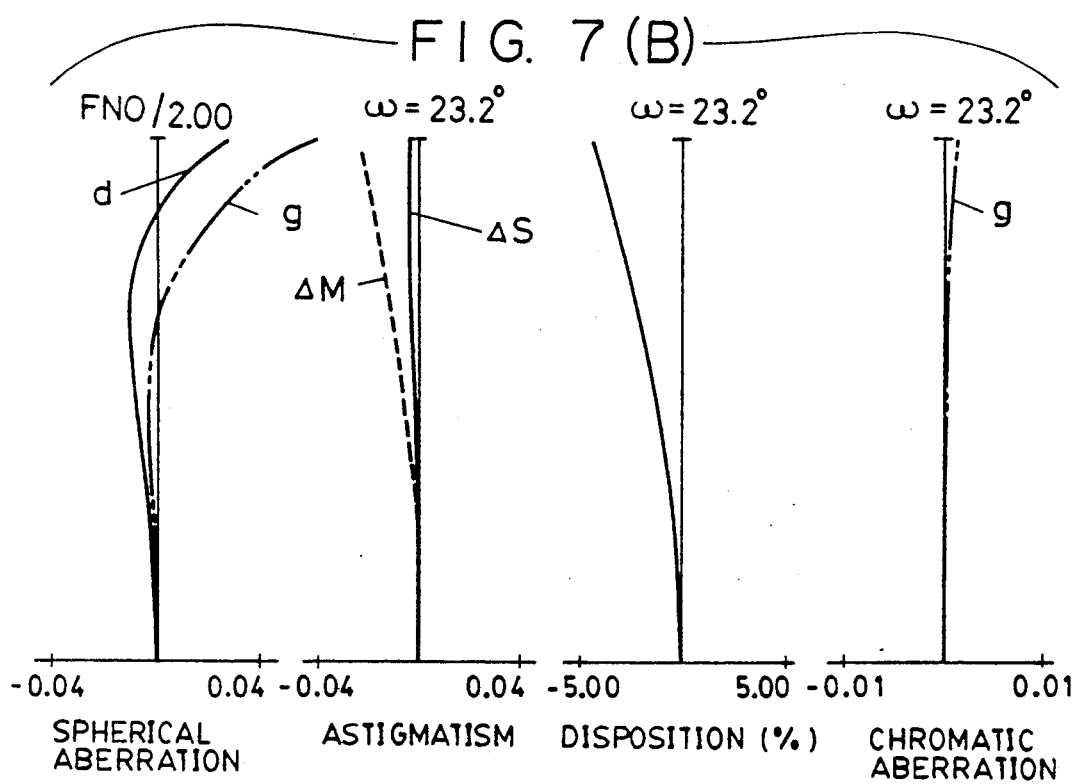

FIGS. 1 and 2 schematically shows a wideangle zoom lens device in accordance with the present invention, wherein a first lens group I disposed on the object side has a negative refractive power; a second lens group II has a positive refractive power; a third lens group III has a negative refractive power, and a fourth lens group IV has a positive refractive power.

The wideangle zoom lens shown also has a diaphragm or stop SP, and a glass block G which may be an infrared cut glass filter. The symbol F represents the focal plane. Arrows show loci of movements of the respective lens groups that are performed when the wideangle zoom lens is operated from a wideangle side to a telephoto side.

In the embodiment shown in FIG. 1, as the wideangle zoom lens device is operated from a wideangle side to a telephoto side, the first lens group is non-linearly moved towards the focal plane, while the third lens group III and the stop SP are stationary. Thereby there is a compensating for movement of the focal plane, caused by the zooming operation. The zooming operation for increasing focal length is performed by moving the second lens group and the fourth lens group independently or integrally towards the object.

The zooming operation is conducted by moving the first lens group in a non-linear fashion. Representing the focal distance of the i-th lens group by Fi, the focal distance of the whole lens system at the widest view angle end by FW and the imaging lateral magnification of the third lens group at the widest view angle end by $\beta3W$, the whole lens system is designed and constructed to meet the following conditions (1) to (3):

$$3.0 < F2/FW < 4.4 \quad (1)$$

$$2.3 < F4/FW < 3.5 \quad (2)$$

$$3.1 < |\beta3W| < 3.95 \quad (3)$$

In the illustrated embodiment, the refractive powers of the lens groups and the conditions of movements of the lens groups are determined as previously described, and also in order to meet the conditions of the formulae (1) to (3). This embodiment, therefore, attains superior optical performance over the entire range of magnification power, as well as a wide view angle of 76° or so, while preserving a long distance back focus of 1.7 l to 1.8 l, where l represents the length of a diagonal line across the photographing area.

A description will now be given of the technical significance of each of the conditions given by the formulae (1) to (3).

The condition of the formula (1) pertains to the ratio of the focal distance of the second lens group to the focal distance of the whole lens system when the lens system is set for the greatest angle of view. This condition must be met in order to obtain a desired variable power ratio while appropriately setting the amount of movement of the second lens group and enabling aberration correction over the entire range of the variable power.

If the positive refractive power of the second lens group is reduced to such a value that the above-mentioned ratio exceeds the upper limit set by the formula (1), the second lens group would be required to move an impractically long distance for attaining desired variable power ratio. As a result the overall length of the whole lens system would be increased. Conversely, if the positive refractive power of the second lens group is reduced to such a value as to make the above-mentioned ratio fall below the lower limit set by the formula (1), the spherical aberration produced by the second lens group would be increased to a level that hardly could be compensated for, by the other lens groups.

The condition (2) pertains to the ratio of the focal distance of the fourth lens group to the focal distance of the whole lens system, when the zoom lens is set to provide the greatest angle of view. The requirement of the formula (2) is established mainly to enable a reduction in the outside diameter of the fourth lens group and to compensate for comatic abberration over the whole image area, while preserving a sufficiently large back focus length.

If the positive refractive force of the fourth lens group is reduced such that above-mentioned ratio exceeds the upper limit set by the formula (2), the fourth lens group is required to have an unacceptably large outside diameter in order to attain a required aperture ratio, e.g., 1.7, in terms of the F number, and comatic aberrations of higher degrees that are produced by the fourth lens group. Conversely, if the positive refractive power of the fourth lens group is increased to such a value that the above-mentioned ratio falls down below the lower limit set by the formula (2), it is difficult to obtain the desired back focus length, due to an inferior inverted telephoto effect from the lens system.

The condition set by formula (3) should be met in order to suitably set the imaging lateral magnification of the third lens group and thereby to facilitate widening of the maximum view angle.

Any absolute value of imaging lateral magnification that exceeds the upper limit set by the formula (3) means that the negative refractive power of the third lens group is so large that refractive powers for the second and fourth lens groups are increased in order to obtain a desired angle of view when the zoom lens device is set for the maximum view angle. This will result in generation of many spherical and comatic aberrations of higher orders. If the absolute value of the imaging lateral magnification exceeds the lower limit set by the formula (3), the refractive powers of the second and fourth lens groups will be reduced, and greater travel of the lens groups will be required to for attain a the desired variable power ratio of the zoom lens. As a result, the overall length of the zoom lens device will be increased, undesirably.

The current demand for compact video cameras requires that both a zooming mechanism and a stop operation mechanism be driven electrically, and incorporated into the zoom lens device. In order to simplify the construction of such a zooming mechanism and stop operation mechanism (as well as the controls for those mechanisms) it is desirable keep as small as possible the number of the lens groups, that have to be moved during the zooming operation. This requirement also applies in the case of ordinary still photography cameras.

In the illustrated embodiment, therefore, the third lens group and the stop SP are kept stationary during the zooming operation, thereby attaining simplification of the associated mechanisms.

Furthermore, according to the invention, the third lens group has the following lens element arrangement, which is adopted mainly for the purpose of well-balanced compensation for spherical and chromatic aberrations over the entire range of the variable power.

The lens element in the third lens group closest to the object has a concaved surface directed toward the object. Representing the radius of the curvature of the above-mentioned lens surface by R31, the focal length of the third lens group by F3, and the mean value of the Abbe numbers of the materials of the lens elements included in the third lens group by $\overline{v3}$, the third lens group also is designed and constructed to meet the conditions of the following formulae (4) and (5):

$$1.1 < R31/F3 < 2.5 \quad (4)$$

$$38 < \overline{v3} < 50 \quad (5)$$

The condition of the formula (4) is established to enable appropriate design of the radius of curvature of the object-side concave surface. This first lens element also has a negative refractive power so as to compensate for spherical aberration generated by this lens element.

A reduction in the negative refractive power of the first lens element to such a level that would make the ratio exceed the upper limit set by the formula (4) would not provide a sufficient compensating effect for spherical aberration. Conventionally, annular spherical aberration is undesirably increased when the negative refractive power of this lens is increased to such a level that this ratio falls down below the lower limit set by formula (4).

The condition of the formula (5) is established to enable suitable determination of the mean value of Abbe numbers of the lens materials of the third lens group, thereby enabling appropriate correction of axial chromatic aberration over the entire range of variable power ratio.

A mean Abbe number value exceeding the upper limit set by the formula (5) will cause an excessive correction of axial chromatic aberration, and would make it difficult for other lens groups to correct the axial chromatic aberration in good balance with a correction of chromatic differences of magnification.

To ensure that the illustrated embodiment will exhibit superior optical performance over the entire image area, and with reduced aberration fluctuation over the entire range of variable power, it is preferred that each of the lens groups also have the following constructions.

The first lens group, which is closest to the object, is preferably composed of four or five lens elements including a positive lens element adjacent to the object, a meniscus-type negative lens element having a convex surface directed toward the object, at least one negative lens element with both surfaces concave, and a positive lens element. These elements are to be arranged in the mentioned order from the object side. The second lens group, which is disposed next to the first lens group, is preferably composed of three lens elements, including a negative lens and a pair of positive lens elements which are arranged in the mentioned order from the end adjacent to the first lens group. The third lens group preferably is composed of a negative lens element and a positive lens element which are arranged in that order from the end adjacent to the second lens group. It is also preferred that the fourth lens group be composed of three lens elements, including a pair of positive lens elements each having a pair of both convex surfaces, and a meniscus-type negative lens element having a concave surface directed toward the imaging plane.

Examples of numerical values according to the factors of an illustrated embodiment, for a wideangle zoom lens in accordance with the present invention, are shown below. In the following illustration, Ri indicates the radius of curvature of the i-th lens surface as counted from the side adjacent the object, Di indicates the thickness of a lens element or an air gap of the i-th lens, as counted from the object side, and Ni and $\nu i$ respectively indicate the refractive index and Abbe number of the i-th glass as counted from the object side. Two lens surfaces, as counted from the final element, are glass blocks such as a plano lens, or a filter. The values of the ratios and factors shown in the formulae (1) to (5), have been calculated on the basis of the numerical values of the examples shown below, and are shown in Table 1.

Example 1
F = 1 to 2.95 FNO = 1: 1.85 to 3.60 2ω = 75.67° to 29.48°

| | | | | | | |
|---|---|---|---|---|---|---|
| R1 = | 51.693 | D1 = 0.446 | N1 = 1.80518 | | ν1 = 25.4 |
| R2 = | −51.693 | D2 = 0.038 | | | |
| R3 = | −6.644 | D3 = 0.233 | N2 = 1.77250 | | ν2 = 49.6 |
| R4 = | 1.987 | D4 = 1.165 | | | |
| R5 = | −57.959 | D5 = 0.233 | N3 = 1.77250 | | ν3 = 49.6 |
| R6 = | 3.352 | D6 = 0.058 | | | |
| R7 = | 2.790 | D7 = 0.543 | N4 = 1.80518 | | ν4 = 25.4 |
| R8 = | 6.158 | D8 variable | | | |
| R9 = | 94.944 | D9 = 0.135 | N5 = 1.74950 | | ν5 = 35.3 |
| R10 = | 2.980 | D10 = 0.543 | N6 = 1.58913 | | ν6 = 61.2 |
| R11 = | −4.381 | D11 = 0.029 | | | |
| R12 = | 2.798 | D12 = 0.485 | N7 = 1.51633 | | ν7 = 64.1 |
| R13 = | −18.658 | D13 variable | | | |
| R14 = | (Stop) | D14 = 0.388 | | | |
| R15 = | −3.775 | D15 = 0.349 | N8 = 1.64769 | | ν8 = 33.8 |
| R16 = | −1.789 | D16 = 0.135 | N9 = 1.69680 | | ν9 = 55.5 |
| R17 = | 6.016 | D17 variable | | | |
| R18 = | −42.762 | D18 = 0.349 | N10 = 1.69680 | | ν10 = 55.5 |
| R19 = | −3.736 | D19 = 0.029 | | | |
| R20 = | 4.642 | D20 = 0.776 | N11 = 1.58913 | | ν11 = 61.2 |
| R21 = | −1.585 | D21 = 0.194 | N12 = 1.80518 | | ν12 = 25.4 |
| R22 = | −3.185 | D22 = 0.776 | | | |
| R23 = | ∞ | D23 = 1.165 | N13 = 1.51633 | | ν13 = 64.1 |
| R24 = | ∞ | | | | |

Bf = 1.044 to 2.403

Focal distances

| Variable gaps | 1.00 | 1.94 | 2.95 |
|---|---|---|---|
| D8 | 5.19 | 1.43 | 0.48 |
| D13 | 0.29 | 0.97 | 1.65 |
| D17 | 1.55 | 0.87 | 0.19 |

Example 2
F = 1 to 2.93 FNO = 1: 1.85 to 2.60 2ω = 75.67° to 29.74°

| | | | | | | |
|---|---|---|---|---|---|---|
| R1 = | 49.72 | D1 = 0.485 | N1 = 1.80518 | | ν1 = 25.4 |
| R2 = | −49.72 | D2 = 0.038 | | | |
| R3 = | −7.112 | D3 = 0.233 | N2 = 1.77250 | | ν2 = 49.6 |
| R4 = | 1.970 | D4 = 1.165 | | | |
| R5 = | −107.851 | D5 = 0.233 | N3 = 1.77250 | | ν3 = 49.6 |
| R6 = | 3.802 | D6 = 0.058 | | | |
| R7 = | 2.813 | D7 = 0.504 | N4 = 1.80518 | | ν4 = 25.4 |
| R8 = | 5.264 | D8 variable | | | |
| R9 = | 9.841 | D9 = 0.155 | N5 = 1.74950 | | ν5 = 35.3 |
| R10 = | 2.782 | D10 = 0.522 | N6 = 1.58913 | | ν6 = 61.2 |
| R11 = | −3.908 | D11 = 0.029 | | | |
| R12 = | 2.798 | D12 = 0.427 | N7 = 1.51633 | | ν7 = 64.1 |
| R13 = | −18.658 | D13 variable | | | |
| R14 = | (Stop) | D14 = 0.388 | | | |
| R15 = | −7.205 | D15 = 0.155 | N8 = 1.77250 | | ν8 = 49.6 |
| R16 = | 4.648 | D16 = 0.271 | | | |
| R17 = | −1.458 | D17 = 0.155 | N9 = 1.69680 | | ν9 = 55.5 |
| R18 = | −4.584 | D18 = 0.388 | N10 = 1.58144 | | ν10 = 40.8 |
| R19 = | −1.768 | D19 variable | | | |
| R20 = | 10.141 | D20 = 0.427 | N11 = 1.69680 | | ν11 = 55.5 |
| R21 = | −4.148 | D21 = 0.029 | | | |
| R22 = | −4.442 | D22 = 0.737 | N12 = 1.58913 | | ν12 = 61.2 |
| R23 = | −2.417 | D23 = 0.194 | N13 = 1.80518 | | ν13 = 25.4 |
| R24 = | −9.944 | D24 = 0.776 | | | |
| R25 = | ∞ | D25 = 1.165 | | | ν14 = 64.1 |
| R26 = | ∞ | | | | |

Bf = 1.198 to 2.654

Focal distances

| Variable gaps | 1.00 | 1.95 | 2.93 |
|---|---|---|---|
| D8 | 5.77 | 1.66 | 0.63 |
| D13 | 0.39 | 1.12 | 1.84 |
| D19 | 1.65 | 0.92 | 0.19 |

Example 3
F = 1 to 2.82 FNO = 1: 1.71 to 2.68 2ω = 75.67° to 30.74°

| | | | | | |
|---|---|---|---|---|---|
| R1 = | 12.289 | D1 = 0.776 | N1 = 1.77250 | ν1 = 49.6 |
| R2 = | 92.002 | D2 = 0.029 | | |

-continued

Example 3
F = 1 to 2.82 FNO = 1: 1.71 to 2.68 2ω = 75.67° to 30.74°

| | | | | | | | |
|---|---|---|---|---|---|---|---|
| R3 = | 6.542 | D3 = | 0.291 | N2 = | 1.77250 | ν2 = | 49.6 |
| R4 = | 2.084 | D4 = | 1.975 | | | | |
| R5 = | −27.412 | D5 = | 0.291 | N3 = | 1.77250 | ν3 = | 49.6 |
| R6 = | 3.801 | D6 = | 0.503 | | | | |
| R7 = | −7.522 | D7 = | 0.233 | N4 = | 1.83400 | ν4 = | 37.2 |
| R8 = | 7.049 | D8 = | 0.195 | | | | |
| R9 = | 5.358 | D9 = | 0.621 | N5 = | 1.84666 | ν5 = | 23.9 |
| R10 = | −20.110 | D10 | variable | | | | |
| R11 = | 5.723 | D11 = | 0.155 | N6 = | 1.84666 | ν6 = | 23.9 |
| R12 = | 2.756 | D12 = | 0.815 | N7 = | 1.51633 | ν7 = | 64.1 |
| R13 = | −5.730 | D13 = | 0.029 | | | | |
| R14 = | 5.659 | D14 = | 0.679 | N8 = | 1.62299 | ν8 = | 58.1 |
| R15 = | −8.946 | D15 | variable | | | | |
| R16 = | Stop | D16 = | 0.542 | | | | |
| R17 = | −8.946 | D17 = | 0.155 | N9 = | 1.71299 | ν9 = | 53.8 |
| R18 = | 2.113 | D18 = | 0.543 | N10 = | 1.84666 | ν10 = | 23.9 |
| R19 = | 4.126 | D19 | variable | | | | |
| R20 = | 5.351 | D20 = | 0.660 | n11 = | 1.69680 | ν11 = | 55.5 |
| R21 = | −5.451 | D21 = | 0.029 | | | | |
| R22 = | 4.992 | D22 = | 1.009 | N12 = | 1.60311 | ν12 = | 60.7 |
| R23 = | −2.617 | D23 = | 0.155 | N13 = | 1.84666 | ν13 = | 23.9 |
| R24 = | −97.939 | D24 = | 0.776 | | | | |
| R25 = | ∞ | D25 = | 1.164 | | | ν14 = | 64.1 |
| R26 = | ∞ | | | | | | |

Bf = 1.198 to 2.654

Focal distances

| Variable gaps | 1.00 | 1.81 | 2.82 |
|---|---|---|---|
| D10 | 4.00 | 0.80 | 0.20 |
| D15 | 0.39 | 1.64 | 2.89 |
| D19 | 3.27 | 2.02 | 0.77 |

| Ratios and factors | Examples | | |
|---|---|---|---|
| | 1 | 2 | 3 |
| (1) F2/FW of formula (1) | 3.301 | 3.301 | 4.065 |
| (2) F4/FW of formula (2) | 3.107 | 3.107 | 4.473 |
| (3) \|β3W\| of formula (3) | 3.655 | 3.629 | 3.32 |
| (4) R31/F3 of formula (4) | 1.215 | 2.319 | 2.001 |
| (5) ν3 of formula (5) | 44.665 | 48.627 | 38.865 |

As will be understood from the foregoing description, according to the present invention, it is possible to obtain a compact wideangle zoom lens which has a view angle of 76° to 31°, a variable power ratio of 3.0 and an F number of 1.7 to 2.7, the zoom lens also will exhibit superior optical performance over the entire range of the variable power, as well as a sufficiently large back focus, by virtue of the fact that the refractive powers and conditions of movements of four lens groups have been appropriately determined, as taught hereinbefore.

WHAT IS CLAIMED IS:

1. A wideangle zoom lens, comprising:
   a first lens group having a negative refractive power;
   a second lens group having a positive refractive power;
   a third lens group having a negative refractive power; and
   a fourth lens group having a positive refractive power, said first to fourth lens groups being arranged from the object side in that order;
   wherein a zooming operation from a wideangle end to a telephoto end is performed by increasing the distance between said second and third lens groups while reducing the distance between said third and fourth lens groups, and zooming is performed by non-linearly moving said first lens group;
   wherein said first to fourth lens groups being arranged to meet the following conditions:

$3.0 < F2/FW < 4.4$;

$2.3 < F4/FW < 3.5$;

$3.1 < |\beta 3W| < 3.95$;

and wherein Fi indicates the focal distance of the i-th lens group, FW indicates the focal distance of the whole lens system at the wideangle end and β3W indicates the imaging lateral magnification of the third lens group at the wideangle end.

2. A wideangle zoom lens according to claim 1, wherein said third lens group is stationary during the zooming operation and wherein said third lens group comprises a plurality of lens elements, the one lens element that is closest to the object side having has a concave surface directed toward said object; and wherein said third lens group is arranged to meet the following conditions:

$1.1 < R31/F3 < 2.5$;

$38 < \nu 3 < 50$; and wherein R 31 indicates the radius of curvature of the concaved surface of said one lens element and ν3 indicates the mean value of the Abbe numbers of materials of the lens elements comprising a said third lens group.

3. A wideangle zoom lens according to claim 2, further comprising a stop that is disposed between said second lens group and said third lens group, and is kept stationary during the zooming operation.

* * * * *

UNITED STATES PATENT AND TRADEMARK OFFICE
CERTIFICATE OF CORRECTION

PATENT NO. : 5,132,848          Page 1 of 2
DATED     : July 21, 1992
INVENTOR(S) : AKIHIRO NISHIO, ET AL.

It is certified that error appears in the above-identified patent and that said Letters Patent is hereby corrected as shown below:

IN THE ABSTRACT:

Column [57]:

Line 3, "second group" should read --second lens group--.

Column 1:

Line 13, "arrnaged" should read --arranged--.

Line 33, Q: "variation from" should read --variation of--.

Column 2:

Line 58, "shows" should read --show--.

Column 4:

Line 33, "for attain a" should read --attain--.

Line 56, "closet" should read --closest--.

Line 57, "concaved" should read --concave--.

Column 5:

Line 64, "i-th glass" should read --i-th lens glass--.

Column 7:

Line 19, "n11=1.69680" should read --N11=1.69680--.

UNITED STATES PATENT AND TRADEMARK OFFICE
CERTIFICATE OF CORRECTION

PATENT NO. : 5,132,848　　　　　　　　Page 2 of 2

DATED : July 21, 1992

INVENTOR(S) : AKIHIRO NISHIO, ET AL.

It is certified that error appears in the above-identified patent and that said Letters Patent is hereby corrected as shown below:

<u>Column 8</u>:

Line 36, "has" should be deleted.

Line 46, "concaved" should read --concave--.

Line 48, "a" should be deleted.

Signed and Sealed this

Twenty-eighth Day of September, 1993

Attest:

BRUCE LEHMAN

*Attesting Officer*　　　　*Commissioner of Patents and Trademarks*